US 11,878,555 B2

(12) United States Patent
Kitahara et al.

(10) Patent No.: US 11,878,555 B2
(45) Date of Patent: Jan. 23, 2024

(54) TIRE

(71) Applicant: Sumitomo Rubber Industries, Ltd., Kobe (JP)

(72) Inventors: Ryotaro Kitahara, Kobe (JP); Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/691,956

(22) Filed: Mar. 10, 2022

(65) Prior Publication Data

US 2022/0314701 A1  Oct. 6, 2022

(30) Foreign Application Priority Data

Apr. 5, 2021  (JP) .................................. 2021-064363

(51) Int. Cl.
 *B60C 11/12* (2006.01)
 *B60C 11/03* (2006.01)

(52) U.S. Cl.
 CPC ...... *B60C 11/1204* (2013.01); *B60C 11/1236* (2013.01); *B60C 2011/039* (2013.01); *B60C 2011/0353* (2013.01)

(58) Field of Classification Search
 CPC ......... B60C 11/1204; B60C 2011/1254; B60C 11/1236; B60C 2011/0386; B60C 2011/039
 See application file for complete search history.

(56) References Cited

U.S. PATENT DOCUMENTS

| 2013/0240100 A1* | 9/2013 | Miyoshi .................. B60C 11/11 152/209.18 |
| 2018/0162172 A1 | 6/2018 | Oji |
| 2019/0308460 A1* | 10/2019 | Kawagoe ................ B60C 11/04 |
| 2019/0308462 A1* | 10/2019 | Yamaoka ............ B60C 11/0306 |
| 2020/0376898 A1 | 12/2020 | Yamaoka et al. |

(Continued)

FOREIGN PATENT DOCUMENTS

| EP | 1 695 843 A1 | 8/2006 | |
| JP | 2000177326 A * | 6/2000 | ............. B60C 11/01 |
| JP | 2007-125978 A | 5/2007 | |

(Continued)

OTHER PUBLICATIONS

JP 2007-125978 machine translation (Year: 2007).*

(Continued)

*Primary Examiner* — Justin R Fischer
*Assistant Examiner* — Wendy L Boss
(74) *Attorney, Agent, or Firm* — Birch, Stewart, Kolasch & Birch, LLP

(57) ABSTRACT

A tire includes a tread portion including a first land portion, the first land portion being provided with a plurality of first sipes. The plurality of first sipes extends in an arc shape manner. The plurality of first sipes is arranged on the first land portion without communicating with lateral grooves extending in a tire axial direction. In a tread plan view, a virtual sipe reference line of each of the plurality of first sipes has an angle equal to or less than 10 degrees with respect to a tire circumferential direction, wherein the virtual sipe reference line is a straight line that connects both ends of each of the plurality of first sipes.

14 Claims, 5 Drawing Sheets

(56) References Cited

U.S. PATENT DOCUMENTS

2023/0094643 A1* 3/2023 Kajiyama ........... B60C 11/1204
152/209.8

FOREIGN PATENT DOCUMENTS

| JP | 2011-20591 A | 2/2011 |
| JP | 2014-76764 A | 5/2014 |
| JP | 2020-196286 A | 12/2020 |
| WO | WO 2018/192694 A1 | 10/2018 |

OTHER PUBLICATIONS

JP 2000-177326 machine translation (Year: 2000).*
JP 2014-076764 machine translation (Year: 2014).*
Extended European Search Report for European Application No. 22161982.8, dated Sep. 6, 2022.

* cited by examiner

TIRE

RELATED APPLICATIONS

This application claims the benefit of foreign priority to Japanese Patent Application No. JP2021-064363, filed Apr. 5, 2021, which is incorporated by reference in its entirety.

FIELD OF THE INVENTION

The present disclosure relates to a tire.

BACKGROUND OF THE INVENTION

The patent document 1 below discloses a pneumatic tire with an outside region which is located outside of a vehicle than the tire equator when mounted to the vehicle. The outside region includes a middle land portion and a shoulder land portion. The middle land portion is provided with outer middle lateral grooves traversing the middle land portion, and the shoulder land portion is provided with outer shoulder lateral grooves traversing the shoulder land portion. The patent document 1 below describes that dry performance, wet performance, and wear resistance performance are improved by defining the inclination direction and the inclination angle of the outer middle lateral grooves and the outer shoulder lateral grooves.

PATENT DOCUMENT

[Patent document 1] Japanese Unexamined Patent Application Publication 2020-196286

SUMMARY OF THE INVENTION

In recent years, it has been desired to further improve dry performance, wet performance and uneven wear resistance.

The present disclosure has been made in view of the above circumstances and has a major object to provide a tire capable of improving dry performance, wet performance and uneven wear resistance.

In one aspect of the disclosure, a tire includes a tread portion including a first land portion, the first land portion being provided with a plurality of first sipes. The plurality of first sipes extends in an arc shape manner. The plurality of first sipes is arranged on the first land portion without communicating with lateral grooves extending in a tire axial direction. In a tread plan view, a virtual sipe reference line of each of the plurality of first sipes has an angle equal to or less than 10 degrees with respect to a tire circumferential direction, wherein the virtual sipe reference line is a straight line that connects both ends of the first sipe.

DETAILED DESCRIPTION OF THE INVENTION

Figure 1:
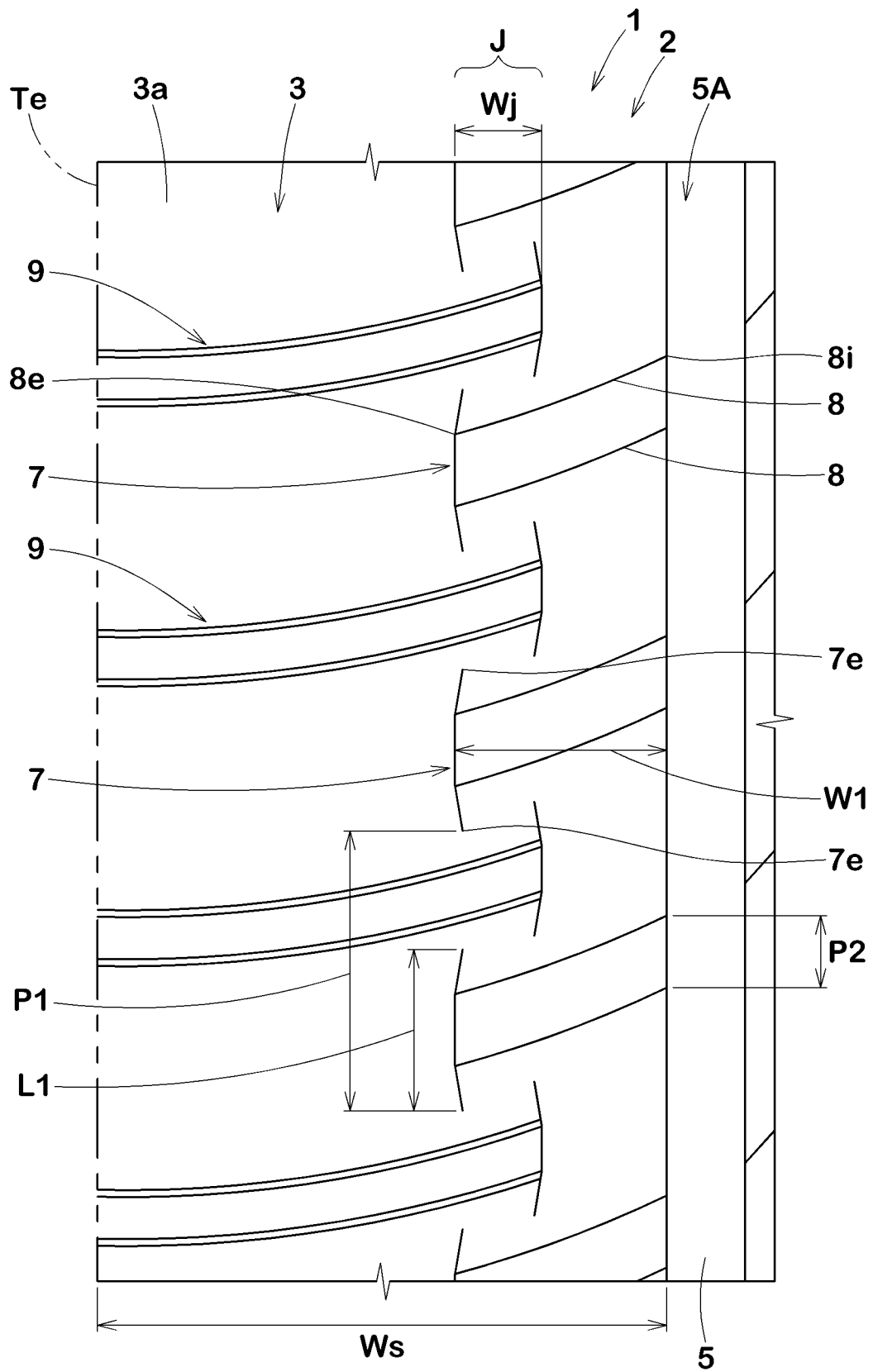
FIG. 1 is a plan view of a first land portion of a tread portion showing an embodiment of a tire according to the present disclosure.

Hereinafter, an embodiment of the present disclosure will be described with reference to the drawings. FIG. 1 is an enlarged plan view of a tread portion 2 of a tire 1 according to an embodiment of the present disclosure. The present disclosure, for example, may be suitably used for pneumatic tires for passenger car. Further, the present disclosure may be used for pneumatic tires for heavy-duty vehicles, light trucks, etc., and non-pneumatic tires that are not filled with compressed air.

As illustrated in FIG. 1, in the present embodiment, the tread portion 2 includes a first land portion 3. The first land portion 3 is provided with a plurality of first sipes 7. As used herein, "sipe" means an incision having a width of less than 1.5 mm.

The plurality of first sipes 7 extends in an arc shape manner. Such a first sipe 7 has a relatively large length compared to a straight sipe (not illustrated). Thus, the water film between the tread surface 3a of the first land portion 3 and the ground can be effectively discharged by scratching force of the first sipes 7. Thus, wet performance of the tire can be improved. Here, "arc shape" means a part of circle or other curved lines. For example, "arc shape" shall include an embodiment in which the angle of the sipe with respect to the tire axial direction continuously varies. In addition, "arc shape" shall include an embodiment in which there are at least two bent portions whose angle changes by 5 degrees or less with an arbitrary point on the sipe as a boundary.

The first sipes 7 are arranged on the first land portion 3 without communicating with lateral grooves extending in the tire axial direction. In the present embodiment, the first sipes 7 are not in communication with any lateral grooves and circumferential grooves arranged on the first land portion 3. Such first sipes 7 can suppress the local decrease in rigidity of the first land portion 3 and can maintain high uneven wear resistance. Further, the first sipes 7 can maintain high dry performance. As used herein, grooves including the lateral grooves, lug grooves described later, and circumferential grooves mean a recessed space having a groove width equal to or more than 1.5 mm.

Figure 2A:
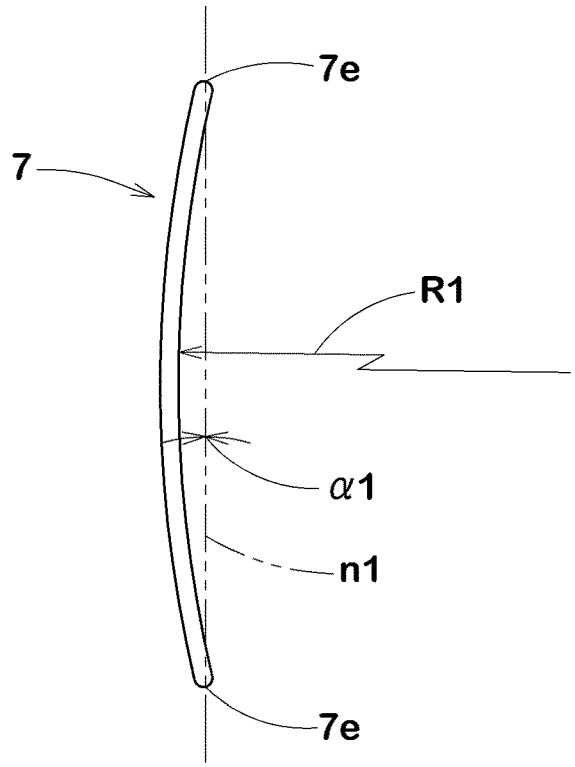
FIG. 2A is an enlarged view of a first sipe.

FIG. 2A is an enlarged view of one of the first sipes 7. As illustrated in FIG. 2A, in a tread plan view, a virtual sipe reference line n1 of each of the first sipes 7 has an angle $\alpha 1$ equal to or less than 10 degrees with respect to the tire circumferential direction. Here, the virtual sipe reference line n1 means a straight line that connects both ends 7e of the first sipe 7. Such a first sipe 7 can improve the contactability with the road surface while suppressing excessive decrease in rigidity in the tire circumferential direction of the first land portion 3, improving dry performance and wet performance.

In order to improve dry performance of the tire, for example, it may be effective to increase the equivalent cornering power (equivalent CP). The equivalent CP is the cornering power (CP) divided by the self-aligning torque power (SATP). Typically, the CP may be generally increased by increasing stiffness of the tread portion 2. The SATP is the self-aligning torque (SAT) when the tire 1 during running is given a slip angle of 1 degree. The SAT is the sum of the braking force and driving force on the tire circumferential direction line of the tread surface 2a (shown in FIG. 3) of the tread portion 2. Therefore, an increase in the rigidity of the tread portion 2 in the tire circumferential direction leads to an increase in SATP, which prevents an increase in the equivalent CP.

Thus, in order to improve the dry performance, it is effective to keep the SATP small while suppressing the decrease in CP, that is, to suppress the increase in the rigidity in the tire circumferential direction of the tread portion 2. In particular, it is desirable to suppress the increase in rigidity in the tire circumferential direction at least one of tread edges Te (shown in FIG. 3) where the SAT tends to be maximum.

As used herein, the tread edges Te are the axial outermost edges of the ground contacting patch of the tire 1 which occurs under the condition such that the tire 1 under a normal state is grounded on a plane with a standard tire load at zero camber angles. Here, "normal state" is such that the tire 1 is mounted onto a standard wheel rim (not illustrated) with a standard pressure but loaded with no tire load. As used herein, unless otherwise noted, dimensions of portions of the tire 1 are values measured under the normal state. Further, the tread width TW is defined as the distance in the tire axial direction between the tread edges Te and Te (shown in FIG. 3).

As used herein, "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, "standard tire load" is a tire load officially approved for each tire by the standards organization on which the tire is based, wherein the standard tire load is the "maximum load capacity" in JATMA, the maximum value given in the above-mentioned table in TRA, and the "Load Capacity" in ETRTO, for example.

Figure 3:
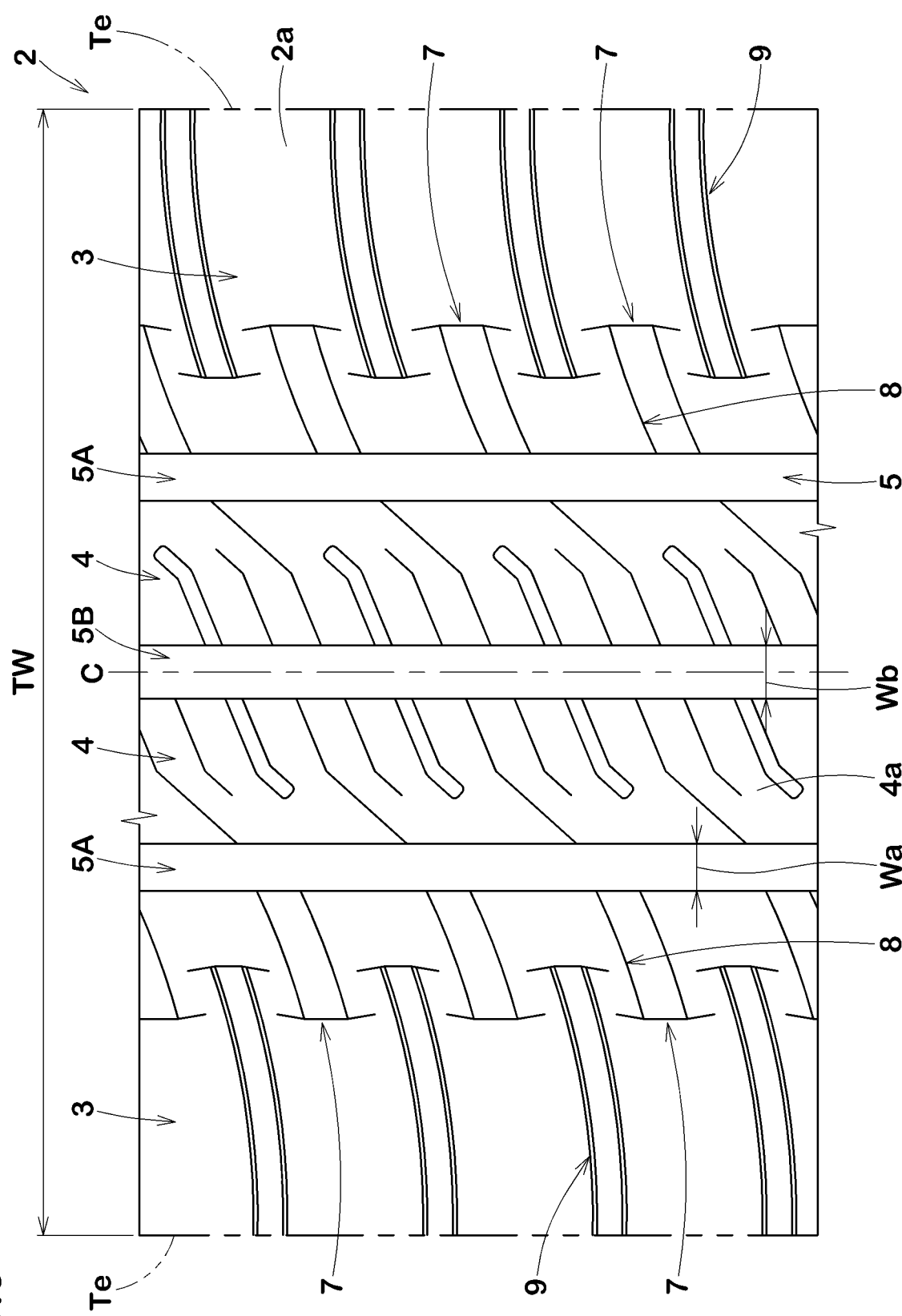
FIG. 3 is a plan view of the tread portion.

FIG. 3 illustrates a plan view of the tread portion 2. As illustrated in FIG. 3, in the present embodiment, the tread portion 2 is provided with a plurality of circumferential grooves 5 extending continuously in the tire circumferential direction. The circumferential grooves 5 include a pair of shoulder circumferential grooves 5A and 5A which is located nearest to the pair of tread edges Te among the circumferential grooves 5, and a crown circumferential groove 5B located between the shoulder circumferential groove 5A and 5A. In the present embodiment, the crown circumferential groove 5B is arranged on the tire equator C. In this embodiment, the tread portion 2 has a point symmetry pattern centered on an arbitrary point on the tire equator C.

In the present embodiment, a pair of first land portions 3 is provided outward in the tire axial direction of the pair of shoulder circumferential grooves 5A. The first land portions 3, for example, are defined between the tread edges Te and the shoulder circumferential grooves 5A. Further, the tread portion 2 includes one or more second land portions 4 between the pair of shoulder circumferential grooves 5A. The second land portions 4, in the present embodiment, are defined between the crown circumferential groove 5B and the respective shoulder circumferential grooves 5A. In the present embodiment, the second land portions 4 are arranged such that the tire equator C is located therebetween.

The shoulder circumferential grooves 5A and the crown circumferential groove 5B, in the present embodiment, extend straight in parallel with the tire circumferential direction. Alternatively, the shoulder circumferential grooves 5A and the crown circumferential groove 5B, for example, extend in a wavy or zigzag manner.

It is preferable that a groove width Wb of the crown circumferential groove 5B is greater than a groove width Wa of the shoulder circumferential grooves 5A. Thus, water under tread surfaces 4a of the second land portions 4, which may be difficult to drain, can be effectively drained, and wet performance can be improved. From the viewpoint of improving both dry performance and wet performance, it is preferable that the groove width Wb of the crown circumferential groove 5B is in a range from about 110% to about 140% of the groove width Wa of the shoulder circumferential grooves 5A. Preferably, the groove width Wa of the shoulder circumferential grooves 5A, for example, is in a range from 3% to 10% of the tread width TW. Further, a groove depth of the shoulder circumferential grooves 5A (not illustrated), for example, is preferably in a range from 8.5 to 11.5 mm. Furthermore, a groove depth of the crown circumferential groove 5B (not illustrated) is preferably in a range from 85% to 115% of the groove depth of the shoulder circumferential grooves 5A.

The first land portions 3 includes the respective tread edges Te. As the first land portion 3 are located axially outermost in the tire axial direction, a large lateral force may apply on either one of the first land portion 3 when cornering. Thus, since the first sipes 7 are provided on the first land portions 3, dry performance and wet performance when cornering can be improved.

As illustrated in FIG. 1, in a tread plan view of each first land portion 3, a radius of curvature R1 (shown in FIG. 2A) of the first sipes 7 is preferably equal to or more than 100% of a width Ws in the tire axial direction of the first land portion 3, more preferably equal to or more than 150%, but preferably equal to or less than 250% of the width Ws, more preferably equal to or less than 200%. When the radius of curvature R1 of the first sipes 7 is equal to or more than 100% of the width Ws of the first land portion 3, excessive reduction in rigidity of the first land portion 3 can be suppressed. When the radius of curvature R1 of the first sipes 7 is equal to or less than 250% of the width Ws of the first land portion 3, a sufficient length of the first sipes 7 can be maintained. Preferably, the radius of curvature R1 of the first sipes 7 may be greater than the width Ws of the first land portion 3. As used herein, the radius of curvature is defined as a single radius of curvature that passes through the three points of both ends of the sipe and its center.

A length L1 in the tire circumferential direction of the first sipes 7, for example, is preferably equal to or more than 40% of a pitch P1 in the tire circumferential direction between two first sipes 7 which are adjacent, more preferably equal to or more than 45%, but preferably equal to or less than 70% of the pitch P1, more preferably equal to or less than 65%. Thus, it may be possible to maintain the improvement in wet performance due to the scratching force of the first sipes 7 while suppressing excessive decrease in the rigidity of the first land portions 3.

A depth of the first sipes 7 (not illustrated), for example, is preferably equal to or more than 50% of the groove depth of the shoulder circumferential grooves 5A, more preferably equal to or more than 75%, but preferably equal to or less than 100% of the groove depth of the shoulder circumferential grooves 5A, more preferably equal to or less than 85%. Preferably, the depth of the first sipes 7 may be smaller than the groove depth of the shoulder circumferential groove 5A.

Each first land portion 3 is provided with a plurality of lateral sipes 8 each connecting the shoulder circumferential groove 5A and a respective one of the first sipes 7. In other words, inner ends 8i in the tire axial direction of the lateral sipes 8 are connected to the shoulder circumferential groove 5A and outer ends 8e in the tire axial direction of the lateral sipes 8 are connected to the respective first sipes 7. As a result, the contactability of the first land portion 3 with the road surface can be improved at the connections between the lateral sipes 8 and the first sipes 7, and at the connections between the lateral sipes 8 and the shoulder sintered groove 5A so that dry performance can further be improved.

In the present embodiment, a set of two lateral sipes 8 is connected to a respective one of the first sipes 7. Thus, the contactability of the first land portion 3 at the connections can further be improved. In addition, such lateral sipes 8 can moderately reduce the rigidity in the tire circumferential direction of the first land portion 3 so as to reduce the SATP. In each first sipe 7, a circumferential distance P2 between the adjacent lateral sipes 8 in the tire circumferential direction, for example, is preferably equal to or more than 40% of the length L1 in the tire circumferential direction of the first sipe 7, more preferably equal to or more than 45%, but preferably equal to or less than 60% of the length L1, more preferably equal to or less than 55%.

The lateral sipes 8, for example, are inclined with respect to the tire axial direction (in FIG. 1, it goes down to the left). In addition, the lateral sipes 8 extend in an arc shape manner so as to be convex toward one direction in the tire circumferential direction (in FIG. 1, it is convex to below). Such lateral sipes 8 have a relatively larger length than a straight sipe, improving wet performance. The lateral sipes 8 are not limited to such an embodiment and may adopt various shapes.

Although not particularly limited, a length W1 in the tire axial direction of the lateral sipes 8 is preferably equal to or more than 25% of the width Ws of the first land portion 3, more preferably equal to or more than 30%, but preferably equal to or less than 55% of the width Ws, more preferably equal to or less than 50%. In addition, although a depth of the lateral sipes 8 (not illustrated) are not limited, the depth is preferably equal to or more than 80% of the depth of the first sipes 7, more preferably equal to or more than 90%, but preferably equal to or less than 120% of the depth of the first sipes 7, more preferably equal to or less than 110%.

In the present embodiment, each first land portion 3 is provided with a plurality of first lug grooves 9 extending inward in the tire axial direction from the tread edge Te. The first lug grooves 9 can reduce the rigidity in the tire circumferential direction of the first land portion 3 at the tread edge Te so as to reduce the SATP, increasing the equivalent CP. Thus, dry performance of the tire can be improved. Further, the first lug grooves 9 can enhance wet performance by smoothly draining the water under the tread surface 3a of the first land portion 3 through the tread edge Te.

Each first lug groove 9, for example, is arranged between a pair of two adjacent first sipes 7 in the tire circumferential direction. In the present embodiment, a single first lug groove 9, for example, is arranged between a pair of two adjacent first sipes 7. Thus, the first land portion 3 can suppress an excessive decrease in rigidity and achieve both wet performance and dry performance.

The first lug grooves 9, for example, are inclined with respect to the tire axial direction (in FIG. 1, it goes down to the left). Thus, the first lug grooves 9 are inclined in the same direction as the lateral sipes 8. In addition, the first lug grooves 9 are formed into an arc shape manner so as to be convex to one direction in the tire circumferential direction (in FIG. 1, it is convex to below). Thus, the first lug grooves 9 are curved to be convex in the same direction as the lateral sipes 8. This may help to ensure a component length in the tire circumferential direction between the adjacent one of the first lug grooves 9 and one of the lateral sipes 8, suppressing a local decrease in rigidity of each first land portion 3. Thus, uneven wear resistance of the tire can be maintained high.

The first lug grooves 9, for example, overlap the lateral sipes 8 in the tire axial direction. Thus, each first land portion 3 includes a circumferentially extending overlapping region J where the first lug grooves 9 and the lateral sipes 8 are overlapped with each other in the tire axial direction. Since such an overlapping region J can moderately reduce the rigidity of the tire circumferential direction of each first land portion 3, the SATP can be further reduced.

Although not particularly limited, a width Wj in the tire axial direction of the overlapping region J is preferably equal to or more than 5% of the width Ws of the first land portion 3, more preferably equal to or more than 10%, but preferably equal to or less than 35% of the width Ws, more preferably equal to or less than 30%.

Figure 4:
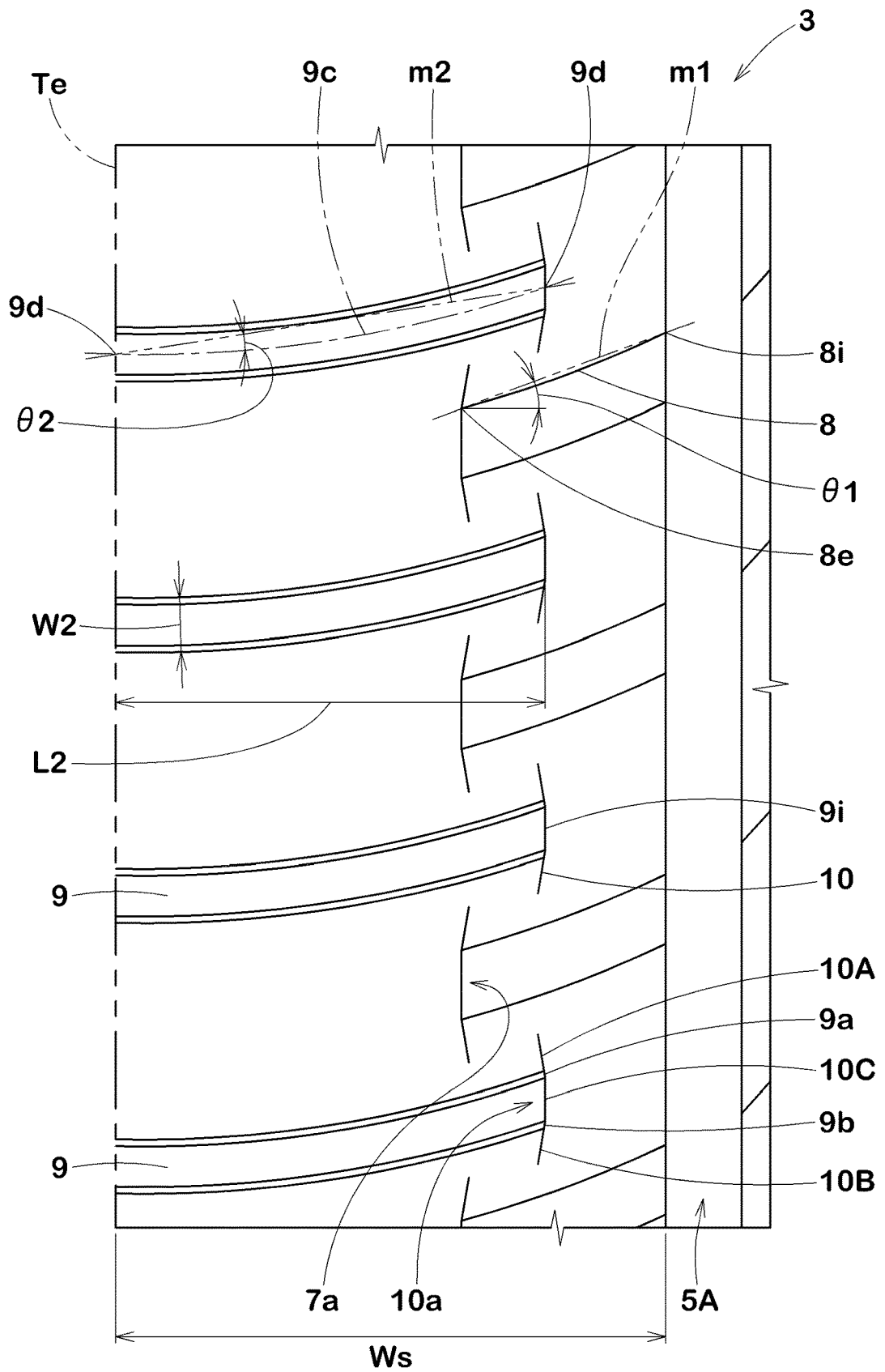
FIG. 4 is a plan view of the first land portion.

FIG. 4 illustrates a plan view of one of the first land portion 3. As illustrated in FIG. 4, an angle θ2 of the first lug grooves 9 with respect to the tire axial direction is preferably smaller than an angle θ1 of the lateral sipes 8 with respect to the tire axial direction. As a result, the rigidity in the tire axial direction on the tread edge Te side of each first land portion 3, which tends to receive a large lateral force, can be maintained high, and the uneven wear resistance can further be improved. As used herein, the angle θ2 of each first lug groove 9 is an angle of the virtual straight line m2 that connects both ends 9d and 9d of the center line 9c of the first lug groove 9. As used herein, the angle θ1 of each lateral sipe 8 is an angle of the virtual straight line m1 that connects both ends of the sipe.

Although not particularly limited, in order to improve dry performance and uneven wear resistance, the difference (θ1−θ2) between the angle θ1 of the lateral sipes 8 and the angle θ2 of the first lug grooves 9 is preferably equal to or more than 5 degrees, more preferably equal to or more than 7 degrees, but preferably equal to or less than 15 degrees, more preferably equal to or less than 13 degrees. In addition, the angle θ2 of the first lug grooves 9 is preferably equal to or more than 20 degrees, more preferably equal to or more than 25 degrees, but preferably equal to or less than 40 degrees, more preferably equal to or less than 35 degrees.

A length L2 in the tire axial direction of the first lug grooves 9 is preferably equal to or more than 75% of the width Ws of the first land portion 3, more preferably equal to or more than 77%, but preferably equal to or less than 85% of the width Ws, more preferably equal to or less than 83%. When the length L2 of the first lug grooves 9 is equal to or more than 75% of the width Ws of the first land portion 3, wet performance of the tire can be improved. When the length L2 of the first lug grooves 9 is equal to or less than 85%, excessive decrease in rigidity of the first land portion 3 can be suppressed and the uneven wear resistance can be improved.

Although not particularly limited, a width W2 of the first lug grooves 9 is preferably equal to or more than 65% of the groove width Wa of the shoulder circumferential grooves 5A, more preferably equal to or more than 70%, but preferably equal to or less than 85% of the groove width Wa, more preferably equal to or less than 80%. In addition, a groove depth of the first lug grooves 9 (not illustrated) is preferably equal to or more than 60% of the groove depth of the shoulder circumferential groove 5A, more preferably equal to or more than 70%, but preferably equal to or less than 100% of the groove depth of the shoulder circumferential groove 5A, more preferably equal to or less than 90%.

In the present embodiment, each first land portion 3 is provided with a plurality of second sipes 10 connected to inner ends 9i in the tire axial direction of the respective first lug grooves 9. The second sipes 10 can moderately reduce the rigidity in the tire axial direction of a portion around the inner ends 9i of the first lug grooves 9, helping to reduce the SATP.

The second sipes 10, for example, extend in the tire circumferential direction. Thus, the contactability of particularly the tread surface 3a of each first land portion 3 can be improved, so that dry performance and wet performance of the tire can be improved.

Figure 2B:
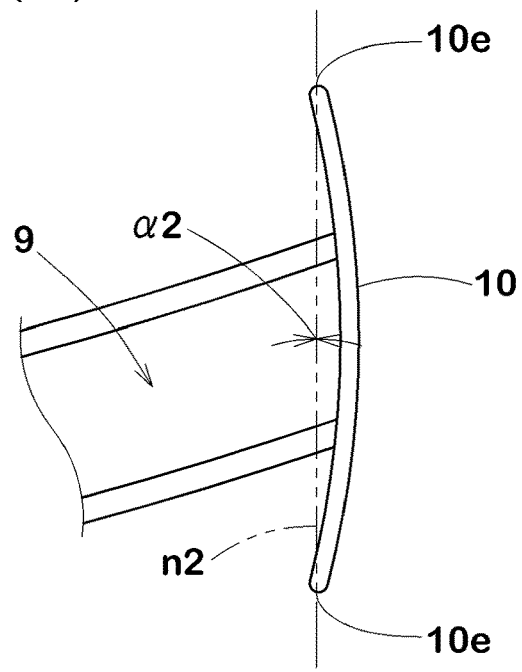
FIG. 2B is an enlarged view of a second sipe.

FIG. 2B is an enlarged view of one of the second sipes 10. As illustrated in FIG. 2B, in a tread plan view, a virtual sipe reference line n2 of each second sipe 10 has an angle α2 equal to or less than 10 degrees with respect to the tire circumferential direction, wherein the virtual sipe reference line n2 of each second sipe 10 is a straight line that connects both ends 10e and 10e of the second sipe 10. Thus, the above-mentioned effects can further be improved.

As illustrated in FIG. 4, in a tread plan view, the second sipes 10 extend in an arc shape manner so as to be convex inward in the tire axial direction. Thus, the second sipes 10 according to the present embodiment have a convex arc shape in the opposite direction to the first sipes 7. Namely, in a tread plan view, the first sipes 7 extend in an arc shape manner so as to be convex outward in the tire axial direction. Further, in the first land portion 3 according to the present embodiment, the first sipes 7 which are convex outward in the tire axial direction and the second sipes 10 which are convex inward in the tire axial direction are alternately provided in the tire circumferential direction. Thus, the decrease in local rigidity of the first land portion 3 due to the first sipes 7 and the second sipes 10 is alleviated, and the uneven wear resistance can be maintained high.

The second sipes 10 are arranged inward in the tire axial direction than the first sipes 7. In the first land portion 3 according to the present embodiment, concave sides 10a of the second sipes 10 and concave sides 7a of the first sipes 7 are arranged so as to face each other. Such an arrangement of the first sipes 7 and the second sipes 10 can enhance steering wheel operability (transient characteristics) of the tire during cornering. In addition, in a pair of first and second sipes which are adjacent in the tire circumferential direction, one end of the first sipes 7 and one end of the second sipes 10 are located close to each other in the tire axial direction. As a result, the water that could not be sucked up by one of the sipes 7 or 10 can be sucked up by the other sipes 7 or 10, and wet performance can be improved. In addition, such an arrangement of the first sipes 7 and the second sipes 10 can make them similar in shape to a single wavy sipe, smoothing the flow of water in each sipe 7 and 10 and improving wet performance.

Each of the second sipes 10, for example, includes a first portion 10A extending toward a first direction in the tire circumferential direction from a circumferential first end 9a of the first lug groove 9, a second portion 10B extending toward a second direction in the tire circumferential direction from a circumferential second end 9b of the first lug groove 9 which is the opposite end to the first end 9a, and a third portion 10C connecting the first portion 10A and the second portion 10B. The third portion 10C, for example, extend so as to form an end of the first lug groove 9. A depth of the first portion 10A (not illustrated), for example, is the same as a depth of the second portion 10B (not illustrated).

The depth of the first portion 10A and the second portion 10B is preferably equal to or less than the groove depth of the first lug grooves 9. Further, a depth of the third portion 10C (not illustrated) is equal to or more than that of the first portion 10A. Furthermore, the depth of the third portion 10C (not illustrated) is equal to or more than that of the first lug grooves 9.

The second sipes 10 are connected to the respective first lug grooves 9 only. In other words, the second sipes 10, in the present embodiment, are not connected to the first sipes 7 and the lateral sipe 8. Thus, reduction in rigidity of the first land portion 3 can be suppressed.

Figure 5:
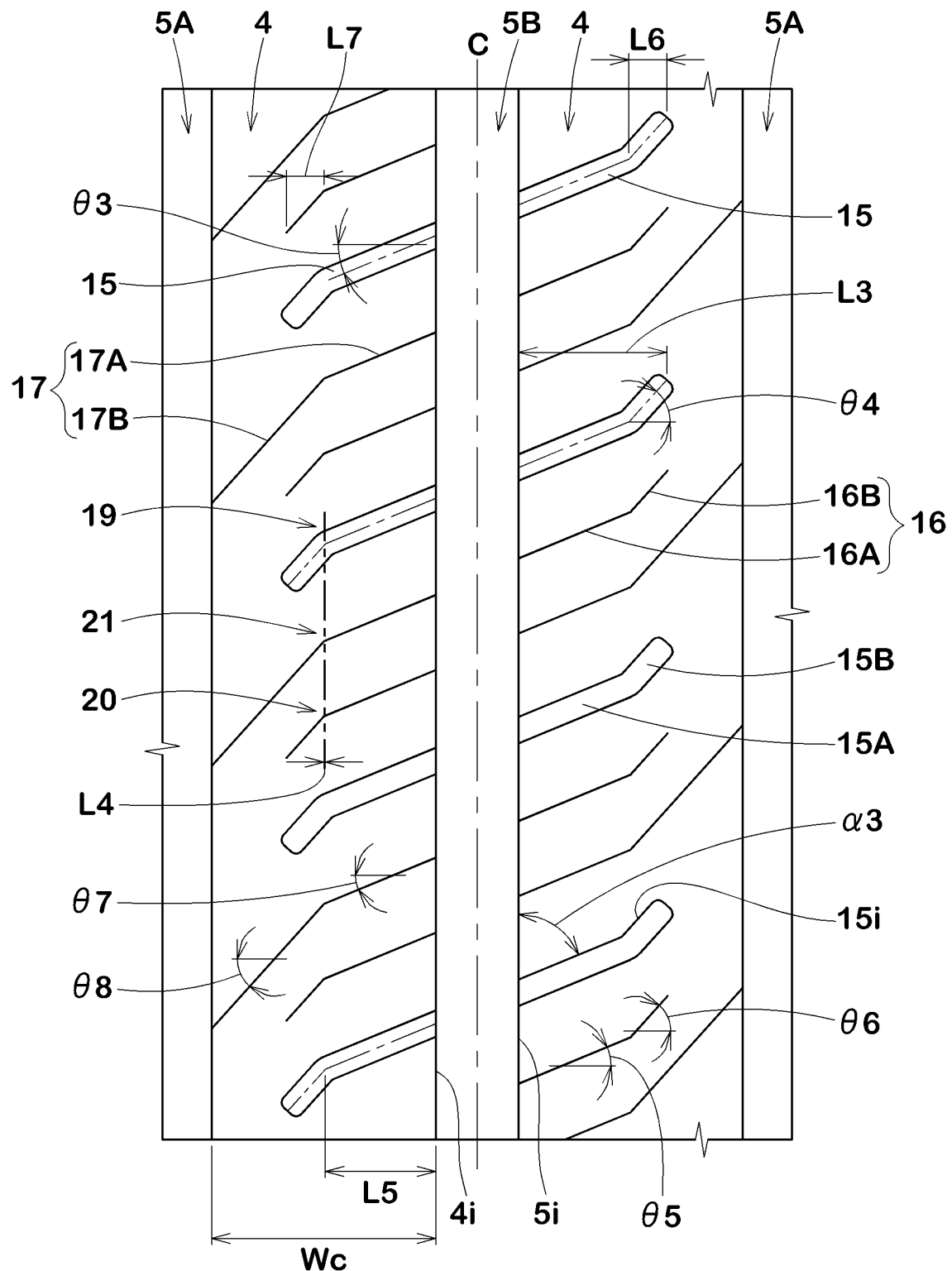
FIG. 5 is a plan view of a second land portion.

FIG. 5 illustrates a plan view of the second land portions 4. As illustrated in FIG. 5, each second land portion 4 according to the present embodiment is provided with second lug grooves 15 extending in the tire axial direction. The second lug grooves 15 according to the present embodiment are connected to the crown circumferential groove 5B. Such second lug grooves 15 extending in the tire axial direction can help to reduce the SATP. Further, the second lug grooves 15 can drain the water in the grooves to the crown circumferential groove 5B, which has a relatively large groove width, to improve wet performance.

The second lug grooves 15 each include a first groove portion 15A extending from the crown circumferential groove 5B, and a second groove portion 15B connected to the first groove portion 15A at a first bending point 19 and having an angle θ4 with respect to the tire axial direction greater than that of the first groove portion 15A. The first groove portion 15A, for example, is inclined at an angle θ3 with respect to the tire axial direction.

A length L3 in the tire axial direction of the second lug grooves 15 is preferably equal to or more than 50% of a width Wc in the tire axial direction of the second land portion 4, more preferably equal to or more than 55%, but preferably equal to or less than 85% of the width Wc, more preferably equal to or less than 80%.

Preferably, an angle α3 between the second lug grooves 15 and the crown circumferential groove 5B is in a range from 30 to 60 degrees. When the angle α3 is equal to or more than 30 degrees, flow of water can be smooth between the second lug grooves 15 and the crown circumferential groove 5B, and high wet performance can be exhibited. When the angle α3 is equal to or less than 60 degrees, the occurrence of uneven wear can be suppressed since reduction in rigidity around the intersections of the second lug grooves 15 and the crown circumferential groove 5B can be suppressed. From the above view point, the angle α3 is further preferably equal to or more than 35 degrees, but equal to or less than 55 degrees. As used herein, the angle α3 of each second lug groove 15 is an angle between one groove edge 15i of the second lug groove 15 and the groove edge 5i of the crown circumferential groove 5B connected to the groove edge 15i.

Each second land portion 4, for example, is further provided with lug sipes 16 extending outward in the tire axial direction from the crown circumferential groove 5B and terminating within the second land portion 4. The lug sipes 16 each include a first sipe portion 16A extending from the crown circumferential groove 5B, and a second sipe portion 16B connected to the first sipe portion 16A at a second bending point 20 and having an angle θ6 with respect to the tire axial direction greater than that of the first sipe portion 16A. In the present embodiment, the first sipe portion 16A is inclined at an angle θ5 with respect to the tire axial direction.

Each second land portion 4, for example, is further provided with full-open sipes 17 which traverse the second land portions 4 in the tire axial direction. The full-open sipes 17 according to the present embodiment each include a third sipe portion 17A extending from the crown circumferential groove 5B, and a fourth sipe portion 17B connected to the third sipe portion 17A at a third bending point 21 and having an angle θ8 with respect to the tire axial direction greater than that of the third sipe portion 17A. In the present embodiment, the third sipe portion 17A is inclined at an angle θ7 with respect to the tire axial direction.

In the present embodiment, the first bending points 20 where the first groove portions 15A are connected to the second groove portions 15B, the second bending points 20 where the first sipe portions 16A are connected to the second sipe portions 16B, and the third bending points 21 where the third sipe portions 17A are connected to the fourth sipe portions 17B are located at the same position in the tire axial direction with each other. As a result, the rigidity in the tire circumferential direction of each second land portion 4 at the location of the first bending points 19 can be reduced, and the SATP can be reduced. As used herein, the "same position" means that the maximum separation distance L4 in the tire axial direction among the bending points 19 to 21 is within 10% of the width Wc of the second land portion 4. In addition, a distance L5 in the tire axial direction between the first bending points 19 and the axial inner edge 4i of the second land portion 4 is preferably in a range from 45% to 55% of the width Wc of the second land portion 4. As a result, an excessive decrease in rigidity of the second land portions 4 can be suppressed.

Preferably, the angle θ3 of the first groove portions 15A with respect to the tire axial direction, the angle θ5 of the first sipe portions 16A with respect to the tire axial direction, and the angle θ7 of the third sipe portions 17A with respect to the tire axial direction are the same as with each other. This can suppress an excessive decrease in rigidity of the second land portions 4, which are affected by a large ground pressure when traveling straight. As used herein, the "same" with respect to angles means that the absolute value of the differences among the angles θ3, θ5 and θ7 is 5 degrees or less. The angle θ3 of the first groove portions 15A, for example, is preferably equal to or more than 30 degrees, more preferably equal to or more than 35 degrees, but preferably equal to or less than 60 degrees, more preferably equal to or less than 55 degrees.

From a similar point of view, the angles θ4, θ6 and θ8 of the second groove portions 15B, the second sipe portions 16B and the fourth sipe portions 17B, respectively are the same as with each other. The angle θ4 of the second groove portions 15B, for example, is preferably equal to or more than 35 degrees, more preferably equal to or more than 40 degrees, but preferably equal to or less than 55 degrees, more preferably equal to or less than 50 degrees.

Preferably, a length L6 in the tire axial direction of the second groove portions 15B is the same as a length L7 in the tire axial direction of the second sipe portions 16B. As used herein, "same" with respect to lengths means that the absolute value of the difference between the length L6 of the second groove portions 15B and the length L7 of the second sipe portions 16B is 10% or less of the width Wc of the second land portions 4.

Preferably, a depth of the second lug grooves 15 (not illustrated) is greater than a depth of the lug sipes 16 (not illustrated). Thus, the effect of improving drainage while suppressing the decrease in the land portion rigidity can be exhibited.

From a similar point of view, a groove depth of the second lug grooves 15 (not illustrated) is preferably greater than a depth of the full-open sipes 17 (not illustrated).

Although not particularly limited, a groove depth of the second lug grooves 15 is preferably equal to or more than 30% of a groove depth of the crown circumferential groove 5B, more preferably equal to or more than 40%, but preferably equal to or less than 100% of the groove depth of the crown circumferential groove 5B, more preferably equal to or less than 90%.

While the particularly preferable embodiments of the tire in accordance with the present disclosure have been described in detail, the present disclosure is not limited to the illustrated embodiments, but can be modified and carried out in various aspects within the scope of the disclosure.

Working Example

Test tires with the basic pattern of FIG. 3 were prepared. Then, dry performance, wet performance and uneven wear resistance of each sample tire were tested. The common specifications and test method of each test tire are as follows. Dry Performance, Wet Performance and Uneven Wear Resistance Test:

Each test tire was mounted on the following test vehicle. Then, a test driver sensually evaluated the dry performance and wet performance based on the stability and operability of the test vehicle when the test vehicle was run on a test course of a dry asphalt road surface and a wet asphalt road surface. In addition, the test driver visually evaluated the uneven wear resistance performance based on the uneven wear caused by running on the test course. The test results are shown using a score with Reference 1 as 100. The larger the number, the better. In Table 1, "A" in "First sipe aspect" represents an aspect of the first sipes that are communicated with the lateral grooves, and "B" represents an aspect of the first sipes that are not communicate with the lateral grooves.

Tire size: 205/65R16
Rim size: 16×6.5J
Internal pressure (kPa): 390 (front)/420 (rear)
Test vehicle: a passenger car with 2000 cc displacement
Table 1 shows the test results.

TABLE 1

|  | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| First sipe aspect | A | B | B | B | B | B | B | B | B |
| α1 (deg.) | 0 | 15 | 0 | 0 | 0 | 0 | 0 | 0 | 0 |
| First sipe shape | arc shape | arc shape | straight | arc shape | arc shape | arc shape | arc shape | arc shape | arc shape |
| Ratio L2/Ws (%) | 80 | 80 | 80 | 80 | 70 | 90 | 80 | 80 | 80 |
| Convex direction of first sipes | outward | outward | outward | outward | outward | outward | Inward | outward | outward |
| Second sipe | applied | applied | applied | applied | applied | applied | applied | none | applied |
| Convex direction of second sipes | inward | inward | inward | inward | inward | inward | inward | — | outward |
| Dry performance [score: larger is better.] | 100 | 95 | 105 | 115 | 115 | 110 | 115 | 110 | 113 |

TABLE 1-continued

|  | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Wet performance [score: larger is better.] | 100 | 105 | 92 | 105 | 100 | 108 | 102 | 103 | 104 |
| Uneven wear resistance performance [score: larger is better.] | 100 | 95 | 103 | 110 | 110 | 107 | 107 | 112 | 107 |
| Total score [320 or more is good] | 300 | 300 | 300 | 330 | 325 | 325 | 324 | 325 | 324 |

As a result of the test, it was confirmed that the tires of the example had excellent dry performance, wet performance and uneven wear resistance.

The following clauses are disclosed regarding the above-described embodiments.

[Clause 1]

A tire comprising: a tread portion comprising a first land portion, the first land portion being provided with a plurality of first sipes, the plurality of first sipes extending in an arc shape manner, the plurality of first sipes being arranged on the first land portion without communicating with lateral grooves extending in a tire axial direction, wherein in a tread plan view, a virtual sipe reference line of each of the plurality of first sipes has an angle equal to or less than 10 degrees with respect to a tire circumferential direction, wherein the virtual sipe reference line is a straight line that connects both ends of each of the plurality of first sipes.

[Clause 2]

The tire according to clause 1, wherein in a tread plan view, the plurality of first sipes is convex outward in the tire axial direction.

[Clause 3]

The tire according to clause 1 or 2, wherein the first land portion comprises a tread edge.

[Clause 4]

The tire according to clause 3, wherein the tread portion is provided with a shoulder circumferential groove adjacent to the first land portion, and the first land portion is provided with a plurality of lateral sipes each connecting the shoulder circumferential groove and a respective one of the plurality of first sipes.

[Clause 5]

The tire according to clause 3 or 4, wherein the first land portion is provided with a plurality of first lug grooves extending inward in the tire axial direction from the tread edge, and a length in the tire axial direction of the plurality of first lug grooves is in a range from 75% to 85% of a width in the tire axial direction of the first land portion.

[Clause 6]

The tire according to clause 5, wherein the first land portion is provided with a plurality of second sipes each connected to a respective one of the plurality of first lug grooves.

[Clause 7]

The tire according to clause 6, wherein the plurality of second sipes extends in the tire circumferential direction.

[Clause 8]

The tire according to clause 6 or 7, wherein in a tread plan view, a virtual sipe reference line of each of the plurality of second sipes has an angle equal to or less than 10 degrees with respect to the tire circumferential direction, wherein the virtual sipe reference line of each of the plurality of second sipes is a straight line that connects both ends of the second sipe.

[Clause 9]

The tire according to any one of clauses 6 to 8, wherein in a tread plan view, the plurality of second sipes extends in an arc shape manner so as to be convex inward in the tire axial direction.

[Clause 10]

The tire according to any one of clauses 6 to 9, wherein the plurality of second sipes is arranged inward in the tire axial direction than the plurality of first sipes.

The invention claimed is:

1. A tire comprising:
   a tread portion comprising a first land portion comprising a tread edge, the first land portion being provided with a plurality of first sipes, a plurality of first lug grooves extending inward in the tire axial direction from the tread edge and terminating within the first land portion, and a plurality of second sipes each connected to a respective one of the plurality of first lug grooves,
   the first land portion being not provided with any lateral grooves that traverse the first land portion completely in a tire axial direction, thereby the first land portion being a circumferentially continuous rib,
   the plurality of first sipes extending in an arc shape manner,
   the plurality of first sipes being arranged on the first land portion without communicating with lateral grooves extending in the tire axial direction,
   the plurality of second sipes extending in a tire circumferential direction,
   the plurality of second sipes being not in communication with the plurality of first sipes,
   wherein
   in a tread plan view, a virtual sipe reference line of each of the plurality of first sipes has an angle equal to or less than 10 degrees with respect to the tire circumferential direction, wherein the virtual sipe reference line is a straight line that connects both ends of each of the plurality of first sipes,
   the tread portion is further provided with a shoulder circumferential groove adjacent to the first land portion, and
   the first land portion is further provided with a plurality of lateral sipes each connecting the shoulder circumferential groove and any one of the plurality of first sipes.

2. The tire according to claim 1, wherein in a tread plan view, the plurality of first sipes is convex outward in the tire axial direction.

3. The tire according to claim 1, wherein
   a length in the tire axial direction of the plurality of first lug grooves is in a range from 75% to 85% of a width in the tire axial direction of the first land portion.

4. The tire according to claim 1, wherein in a tread plan view, a virtual sipe reference line of each of the plurality of second sipes has an angle equal to or less than 10 degrees with respect to the tire circumferential direction, wherein the virtual sipe reference line of each of the plurality of second sipes is a straight line that connects both ends of the second sipe.

5. The tire according to claim 1, wherein in a tread plan view, the plurality of second sipes extends in an arc shape manner so as to be convex inward in the tire axial direction.

6. The tire according to claim 1, wherein the plurality of second sipes is arranged inward in the tire axial direction than the plurality of first sipes.

7. The tire according to claim 1, wherein in a tread plan view of the first land portion, a radius of curvature R1 of each first sipe is in a range from 100% to 250% of a width Ws in the tire axial direction of the first land portion.

8. The tire according to claim 1, wherein in a tread plan view, the angle of the virtual sipe reference line of each of the plurality of first sipes is zero degrees with respect to the tire circumferential direction.

9. The tire according to claim 1, wherein a length L1 in the tire circumferential direction of the plurality of first sipes is in a range from 40% to 70% of a pitch P1 in the tire circumferential direction between two first sipes which are directly adjacent in the tire circumferential direction.

10. The tire according to claim 1, wherein
the plurality of lateral sipes comprises a plurality of sets consisting of two lateral sipes, and
each set of two lateral sipes is connected to a respective one of the plurality of first sipes.

11. The tire according to claim 2, wherein
in a tread plan view, a virtual sipe reference line of each of the plurality of second sipes has an angle equal to or less than 10 degrees with respect to the tire circumferential direction, wherein the virtual sipe reference line of each of the plurality of second sipes is a straight line that connects both ends of the second sipe.

12. The tire according to claim 11, wherein in a tread plan view, the plurality of second sipes extends in an arc shape manner so as to be convex inward in the tire axial direction.

13. The tire according to claim 12, wherein the plurality of first sipes and the plurality of second sipes are arranged alternately in the tire circumferential direction.

14. The tire according to claim 1, wherein
both ends of each of the plurality of first sipes are closed.

* * * * *